United States Patent
Vempati et al.

(10) Patent No.: US 10,458,301 B2
(45) Date of Patent: Oct. 29, 2019

(54) REACTANT RELEASE ARRANGEMENT

(71) Applicant: Eberspächer Exhaust Technology GmbH & Co. KG, Neunkirchen (DE)

(72) Inventors: Krishna Kumar Vempati, Esslingen (DE); Enver Kurpejovic, Kirchheim unter Teck (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 0 days.

(21) Appl. No.: 15/808,221

(22) Filed: Nov. 9, 2017

(65) Prior Publication Data

US 2018/0135487 A1    May 17, 2018

(30) Foreign Application Priority Data

Nov. 14, 2016  (DE) .................. 10 2016 121 741
Jan. 9, 2017   (DE) .................. 10 2017 100 246

(51) Int. Cl.
   *F01N 3/20*   (2006.01)
   *F01N 3/28*   (2006.01)
   *F01N 13/08*  (2010.01)

(52) U.S. Cl.
   CPC ......... *F01N 3/2006* (2013.01); *F01N 3/2066* (2013.01); *F01N 3/2892* (2013.01); *F01N 13/08* (2013.01); *F01N 2240/20* (2013.01); *F01N 2330/22* (2013.01); *F01N 2610/02* (2013.01); *F01N 2610/102* (2013.01); *Y02A 50/2325* (2018.01); *Y02T 10/24* (2013.01)

(58) Field of Classification Search
   CPC combination set(s) only.
   See application file for complete search history.

(56) References Cited

U.S. PATENT DOCUMENTS

| 9,188,039 B2 * | 11/2015 | Nagel ................. F01N 3/2892 |
| 2004/0098975 A1 * | 5/2004 | Van Nieuwstadt ........................ B01D 53/9431 60/286 |
| 2005/0013756 A1 | 1/2005 | Amou et al. |
| 2008/0260597 A1 * | 10/2008 | Suzuki .................. B01B 1/005 422/148 |

(Continued)

FOREIGN PATENT DOCUMENTS

| DE | 10 2004 020 138 A1 | 11/2005 |
| DE | 10 2008 043408 A1 | 5/2010 |

(Continued)

*Primary Examiner* — Binh Q Tran
(74) *Attorney, Agent, or Firm* — McGlew and Tuttle, P.C.

(57) ABSTRACT

A reactant release arrangement for an exhaust gas stream of an internal combustion engine has an exhaust gas guide element (12) with an exhaust gas flow duct (13). A reactant release body (14) extends into the exhaust gas flow duct (13) and has a reactant-receiving volume (20) with a wall inner surface (32) and a wall outer surface (18) of a body wall (16) that is open to the exhaust gas flow duct (13) via at least one passage opening (44, 46). Exhaust gas (G) flowing in the exhaust gas flow duct (13) flows around the reactant release body (14) at a wall outer surface (18) of the body wall (16). A reactant release unit (22) releases reagent (M) into the reactant-receiving volume (20). A heating device (38) is associated with an area of the inner surface (32) of the body wall (16) and heats the reactant release body (14).

25 Claims, 11 Drawing Sheets

(56) References Cited

U.S. PATENT DOCUMENTS

| | | | |
|---|---|---|---|
| 2011/0023470 A1* | 2/2011 | Bruck | B01B 1/005 60/295 |
| 2012/0045378 A1* | 2/2012 | Soukhojak | B01B 1/005 423/212 |
| 2013/0152558 A1 | 6/2013 | Loman | |

FOREIGN PATENT DOCUMENTS

| | | |
|---|---|---|
| DE | 10 2011 078 877 A1 | 1/2013 |
| EP | 1 481 719 A2 | 12/2004 |
| EP | 2 133 527 A1 | 12/2009 |
| JP | 2004-353523 A | 12/2004 |
| JP | 2008-075527 A | 4/2008 |
| WO | 39/56 858 A2 | 11/1999 |

* cited by examiner

REACTANT RELEASE ARRANGEMENT

CROSS REFERENCE TO RELATED APPLICATIONS

This application claims the benefit of priority under 35 U.S.C. § 119 of German Applications DE 10 2016 121 741.7, filed Nov. 14, 2016 and DE 10 2017 100 246.4, filed Jan. 9, 2017, the entire contents of which are incorporated herein by reference.

FIELD OF THE INVENTION

The present invention pertains to a reactant release arrangement, with which reactant, for example, a urea/water solution, can be released into the exhaust gas stream of an internal combustion engine.

BACKGROUND OF THE INVENTION

To reduce the percentage of nitrogen oxides in the exhaust gas discharged by a diesel internal combustion engine, it is known that a reactant supporting the selective catalytic reduction can be introduced into the exhaust gas stream. It is necessary in this connection for carrying out the catalytic reaction effectively to bring about effective mixing of the reactant with the exhaust gas flowing in an exhaust system. In general, a mixer, which shall bring about a swirling with a plurality of flow deflection surfaces in the exhaust gas stream and hence improved mixing of the exhaust gas with the reactant injected into the exhaust gas, in general, in the form of a spray, is arranged for this, in general, downstream of the location at which the reactant is introduced.

SUMMARY OF THE INVENTION

An object of the present invention is to provide a reactant release arrangement for releasing a reactant into the exhaust gas stream of an internal combustion engine, which arrangement can bring about mixing of the reactant introduced into the exhaust gas with the exhaust gas largely independently from the external conditions.

This object is accomplished according to the present invention by a reactant release arrangement for releasing reactant into the exhaust gas stream of an internal combustion engine, comprising: an exhaust gas guide element providing an exhaust gas flow duct, through which exhaust gas can flow in a main exhaust gas flow direction, a reactant release body carried extending into the exhaust gas flow duct along a longitudinal axis of the body at the exhaust gas guide element with a body wall, wherein a reactant-receiving volume surrounded by a wall inner surface of the body wall is provided in the reactant release body and wherein exhaust gas flowing at a wall outer surface of the body wall can flow around the reactant release body, wherein the reactant-receiving volume is open to the exhaust gas flow duct via at least one passage opening, and a reactant release unit for releasing reactant into the reactant-receiving volume, wherein a heating device for heating the reactant release body is associated with the body wall at least in the area of the wall inner surface of the body wall.

It is ensured in the reactant release arrangement configured according to the present invention by heating the body wall defining the reactant-receiving volume that reactant injected into this volume and reaching the wall inner surface is heated and evaporated as a result and it can thus be mixed efficiently with the exhaust gas flowing around the reactant release body. The formation of reactant deposits in the area of the reactant injection area is thus suppressed as well.

To make it possible to provide for an efficient wetting of the wall inner surface with the reactant injected into the reactant-receiving volume, it is proposed that the reactant-receiving volume be configured tapered in a tapering direction in at least some areas in the direction of the longitudinal axis of the body. The reactant spreading, in general, in the form of a spray cone, this faces a tapering reactant-receiving volume and a correspondingly tapering wall inner surface. The reactant-receiving volume can thus be configured tapering in different ways. For example, the reactant-receiving volume may be configured tapering essentially conically in at least some areas. As an alternative or in addition, the reactant-receiving volume may taper hyperbolically or in a curved manner in at least some areas.

The tapering structure of the reactant-receiving volume may be provided, for example, by the body wall being configured tapering essentially conically in the tapering direction in at least some areas.

It should be noted in this connection that it is stated in the sense of the present invention that the body wall or a wall surface has a tapering configuration, the provision of a funnel-shaped or conical, frustoconical structure by such a wall or surface is meant thereby, regardless of whether, for example, the thickness of the wall itself varies.

Provisions may be made in an especially advantageous embodiment of the reactant release arrangement according to the present invention for the body wall to be configured preferably essentially conically tapering in the tapering direction in a first length area adjoining, for example, the exhaust gas guide element and such that it has a passage opening or/and is open in the direction of the longitudinal axis of the body in a preferably essentially tubular length area adjoining the first length area. It can be guaranteed with such a configuration that efficient wetting of the wall inner surface and evaporation of the reactant from the wall inner surface take place in the first length area, while mixing of the reactant with the exhaust gas flowing around the reactant release body can be provided in the second length area.

To make it possible to efficiently utilize the heat being transported in the exhaust gases flowing in the exhaust gas flow duct to heat the reactant release arrangement, it is proposed that the body wall with its first length area and with its second length area be arranged in the exhaust gas flow duct, preferably such that the first length area is positioned in the area of its greatest radial dimension in relation to the longitudinal axis of the body such that it adjoins the exhaust gas guide element.

In an alternative embodiment, the body wall may be arranged at least partly and preferably essentially completely outside the exhaust gas flow duct with its first length area and at least partly in the exhaust gas flow duct with its second length area, preferably such that the first length area is positioned adjoining the exhaust gas guide element in the area of its smallest radial direction in relation to the longitudinal direction of the body or/and in the area of a transition area from the first length area to the second length area. It is ensured in this manner that the exhaust gas stream is affected adversely by the reactant release arrangement as little as possible.

It is proposed for an alternatively, highly compact mode of construction that the body wall preferably has an essentially conically tapering configuration in the tapering direction in a length area adjoining the exhaust gas guide element and has at least one passage opening in this length area or/and is open preferably in the direction of the longitudinal axis of the body at an end of this length area, which end is located at a distance from the exhaust gas guide element.

Efficient wetting of the wall inner surface can be guaranteed if the reactant release unit for releasing reactant into the reactant-receiving volume is arranged in a main reactant release direction that is essentially parallel to the longitudinal axis of the body and corresponds essentially to the main reactant release direction.

To prevent reactant from being discharged in the form of droplets from the reactant-receiving volume, it is proposed that the reactant-receiving volume be open in the area of an opening for the discharge of reactant and that a reactant filter be provided in the reactant-receiving volume, preferably in the area of the opening. The essential task of the reactant filter is consequently to retain droplets and to allow essentially only reactant that is in the gaseous or vapor form to leave the reactant-receiving volume. This can be brought about in an especially simple manner by the reactant filter comprising porous material, preferably metal foam material.

The evaporation of reactant introduced in the form of droplets can further be supported by a reactant deflection element being provided in the reactant-receiving volume.

To provide a surface deflecting the reactant in the direction of the body wall, the reactant deflection element may be configured such that it expands preferably conically in the direction away from the reactant release unit.

The longitudinal axis of the body is preferably essentially at right angles to the main exhaust gas flow direction.

To integrate the heating device in the reactant release body, it is proposed that the body wall comprise an inner wall providing the wall inner surface at least partly and an outer wall providing the wall outer surface at least partly, and that the heating device be arranged between the inner wall and the outer wall.

To avoid heat losses to the extent possible, especially when an internal combustion engine or an exhaust system is operated at a high load at comparatively low temperatures, it is proposed that the body wall comprise an intermediate wall arranged between the inner wall and the outer wall, and that the heating device be arranged between the inner wall and the intermediate wall or/and that insulating material be arranged between the intermediate wall and the outer wall.

The heating device may be arranged such that it surrounds the inner wall in a preferably helical manner. For example, the heating device may comprise a heat conductor surrounding the inner wall in a helical manner.

Since heating of the reactant release body or of the wall inner surface thereof is advantageous for an efficient evaporation of the reactant especially where the reactant reaches the surface, it is proposed that the heating device be arranged with tapering reactant release volume at least in one length area of the body wall.

The present invention further pertains to an exhaust system for an internal combustion engine, preferably in a vehicle, comprising a reactant release arrangement configured according to the present invention.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
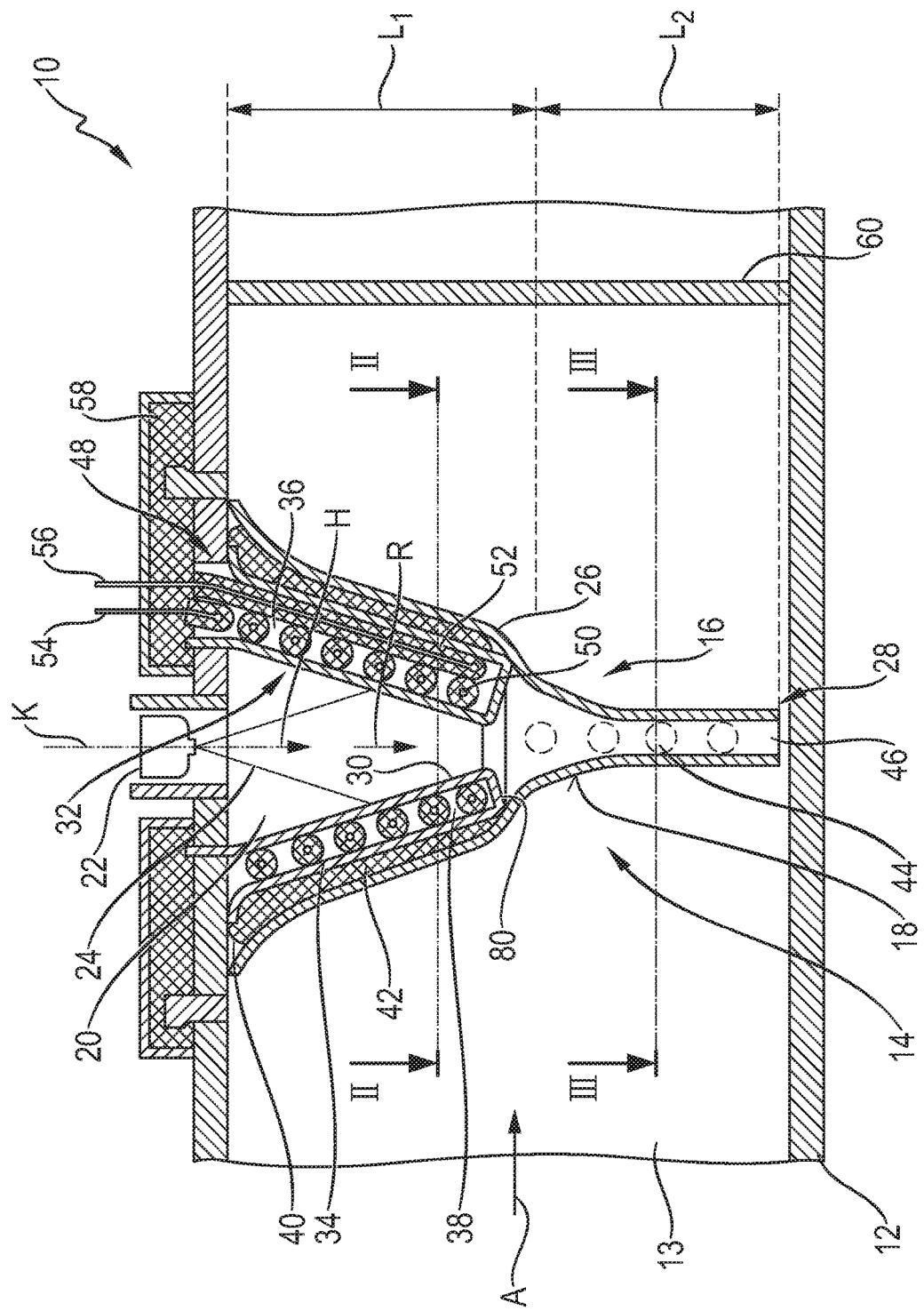
FIG. 1 is a longitudinal sectional view of a reactant release arrangement.
Figure 2:
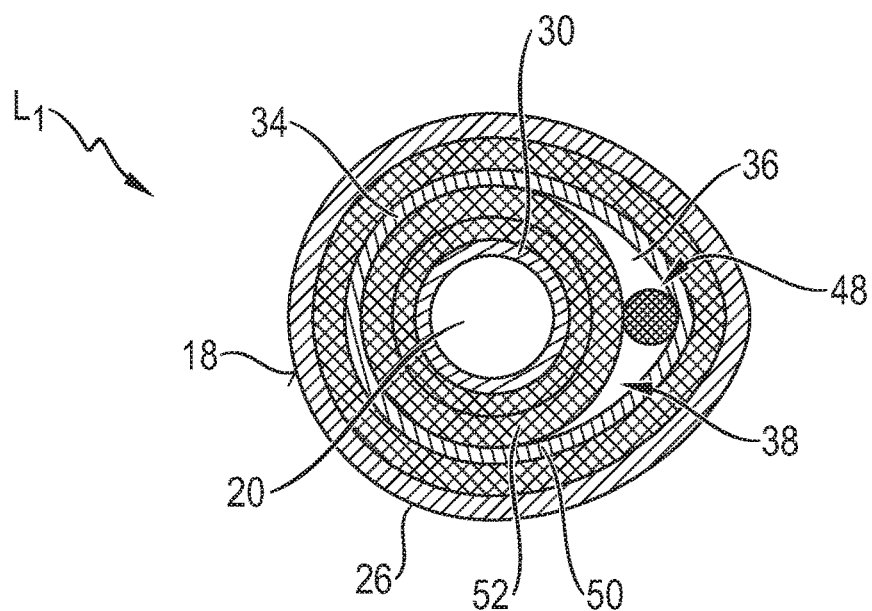
FIG. 2 is a sectional view through a reactant release body of the reactant release arrangement according to FIG. 1, cut along a line II-II in FIG. 1.
Figure 3:
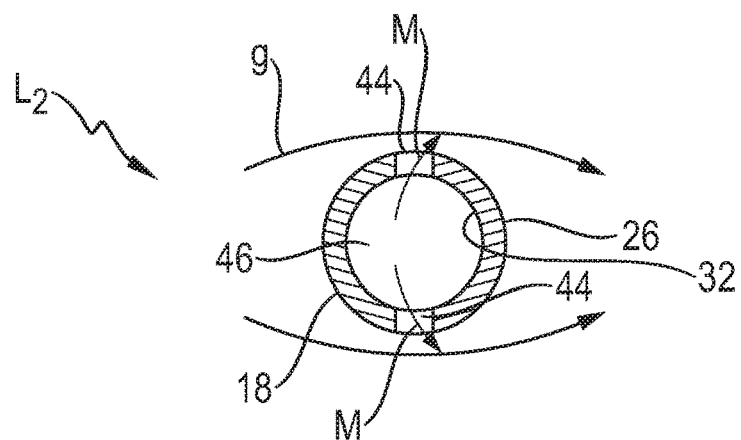
FIG. 3 is a sectional view through a reactant release body of the reactant release arrangement according to FIG. 1, cut along a line III-III in FIG. 1.

Referring to the drawings, FIGS. 1 through 3 show a first embodiment of a reactant release arrangement generally designated by 10, through which a reactant, for example, a urea/water solution, can be introduced into the exhaust gas flowing in an exhaust system of an internal combustion engine.

The reactant release arrangement 10 comprises an exhaust gas guide element 12, which has, for example, a tubular configuration and which may be integrated in an exhaust system or connected to tube sections of the exhaust system. Exhaust gas flows in the exhaust gas guide element 12 in an exhaust gas flow duct 13 in a main exhaust gas flow direction A, which essentially also corresponds to the direction of the longitudinal extension of the exhaust gas guide element. It should be noted that flow directions of the exhaust gas being guided in the exhaust gas guide element 12 that deviate from this main exhaust gas flow direction A may also occur locally in the exhaust gas guide element 12.

A reactant release body generally designated by 14 is carried at the exhaust gas guide element 12. The reactant release body 14 has a tapering structure, for example, a structure tapering in a funnel-shaped manner or conically or frustoconically generally in the direction of a longitudinal axis K of the body in a tapering direction R, which is oriented essentially parallel to the longitudinal axis K of the body.

The reactant release body 14 has a body wall, which is generally designated by 16 and is elongated in the direction of or surrounds the longitudinal axis K of the body. In the area of its greatest radial dimension in relation to the longitudinal axis K of the body, the body wall 16 is connected to the exhaust gas guide element 12.

The reactant release body 14 is arranged in the interior of the exhaust gas guide element with such an orientation that its body longitudinal axis K is essentially at right angles to the main exhaust gas flow direction A. The exhaust gas flowing in the exhaust gas guide element 12 in the main exhaust gas flow direction A towards the reactant release body 14 flows around the reactant release body 14 at a wall outer surface 18 of the body wall 16.

A reactant-receiving volume, which is generally designated by 20 and tapers in the direction of the body longitudinal axis K based on the funnel-shaped structure of the body wall 16, is provided in the interior of the reactant release body 14. Reactant is injected into the reactant-receiving volume 20 in a main reactant release direction H through a reactant release unit 22, for example, an injector, which is arranged at the exhaust gas guide element 12, for example, essentially centrally in relation to the body longitudinal axis K. The main reactant release direction H corresponds essentially to the tapering direction R and is preferably oriented essentially parallel to the body longitudinal axis K. The reactant released through the reactant release unit 22 and injected into the reactant-receiving volume 20 is released, in general, in the form of spray cone 24, which occupies a volume expanding in the direction away from the reactant release unit 22 in relation to the main reactant release direction H.

The reactant release body 14 has two length areas $L_1$, $L_2$. The reactant release body 14 is provided with the above-described, tapering or funnel-shaped structure in the first length area $L_1$. In the second length area $L_2$, after a transition area 80, the reactant release body 14 is provided in an essentially tubular form with approximately constant cross-sectional geometry. An outer wall 26 of the reactant release body, which wall provides the wall outer surface 18, extends from the area in which it is arranged on the exhaust gas guide element 12 to a free end area 28, in which the outer wall 26 ends at a spaced location from the exhaust gas guide element 12. The reactant release body 14 is thus carried at the exhaust gas guide element 12 in the area of its greatest radial dimension in relation to the longitudinal axis K of the body.

An inner wall 30 extending essentially only in the first length area $L_1$ and the outer wall 26 provide essentially a wall inner surface 32 of the reactant release body, and the area of the wall inner surface 32, which area is provided by the inner wall 30, essentially also defines the reactant-receiving volume 20.

An intermediate wall 34 made, for example, integrally in one part with the inner wall 30, is located in the first length area $L_1$ between the inner wall 30 and the outer wall 18. A heating device 38, which will be explained in detail below, is arranged in a volume area 36 enclosed between the inner wall 30 and the intermediate wall 34. Insulating material 42, i.e., a material that has a lower thermal conductivity than the material of which the intermediate wall 34 and the material of the outer wall 26 are made, is arranged in a volume area 40 enclosed between the intermediate wall 34 and the outer wall 26. For example, the inner wall 30, the intermediate wall 34 formed integrally with it and the outer wall 26 may be provided from a metallic material, especially by shaping sheet metal material.

In the second length area $L_2$, the outer wall 26 has a plurality of passage openings 44 following one another in the direction of the body longitudinal axis L and distributed, for example, over the circumference. Further, the outer wall 26 and hence the reactant-receiving volume 20 are open in the free end area via an opening 46 in the direction of the body longitudinal axis K.

The heating device 38 may comprise, for example, a heat conductor 48 helically surrounding the inner wall 30 with an electrically conductive core 50 and with a jacket 52 surrounding this core 50. Corresponding to the funnel-shaped or tapering structure of the inner wall 30, the winding diameter of the heat conductor 48 decreases in the tapering direction R. Connection areas 54, 56 are led out of the exhaust gas guide element 12 and an insulating device 58 surrounding the exhaust gas guide element 12 especially in the area in which the reactant release body 14 is carried at the exhaust gas guide element 12 for connection to a power source.

During the operation of an internal combustion engine and with exhaust gas flowing in the exhaust gas guide element 12, reactant is injected into the reactant-receiving volume 20 through the reactant release unit 22 to bring about a selective catalytic reduction in a catalytic converter arranged downstream of the reactant release arrangement 10 in an exhaust system. The reactant injected, in general, in a spray form impinges on the wall inner surface 32 provided by the inner wall 30. Due to the heating of the inner wall 30 and hence of the part of the wall inner surface 32, which part is provided by this inner wall, the reactant wetting the surface of the inner wall 30 is evaporated, so that together with the part of the reactant that does not reach the inner wall 30 and is introduced into the reactant-receiving volume 20 in the form of droplets, the part of the reactant that is again evaporated from the inner wall 30 flows into the second length area $L_2$ of the reactant release body 14 in the main reactant release direction H. Since, as is shown in FIG. 3, exhaust gas G flows around the reactant release body 14 in the area the outer surface 18 thereof, a vacuum is generated especially also in the outer circumferential area of the second length area $L_2$, so that the discharge of reactant M from the tubular second length area $L_2$ through the passage openings 44 and also through the opening 46 is supported by a suction pump effect. The reactant M thus introduced into the exhaust gas stream in the form of droplets or in the form of a vapor can be mixed very efficiently with the exhaust gas G, because swirling, which supports the mixing, can already develop during the flow around the reactant release body 14. Further, a mixer 60, which is schematically shown in FIG. 1 and ensures an additional mixing of reactant M and exhaust gas G, is arranged downstream of the reactant release body 14.

Figure 4:
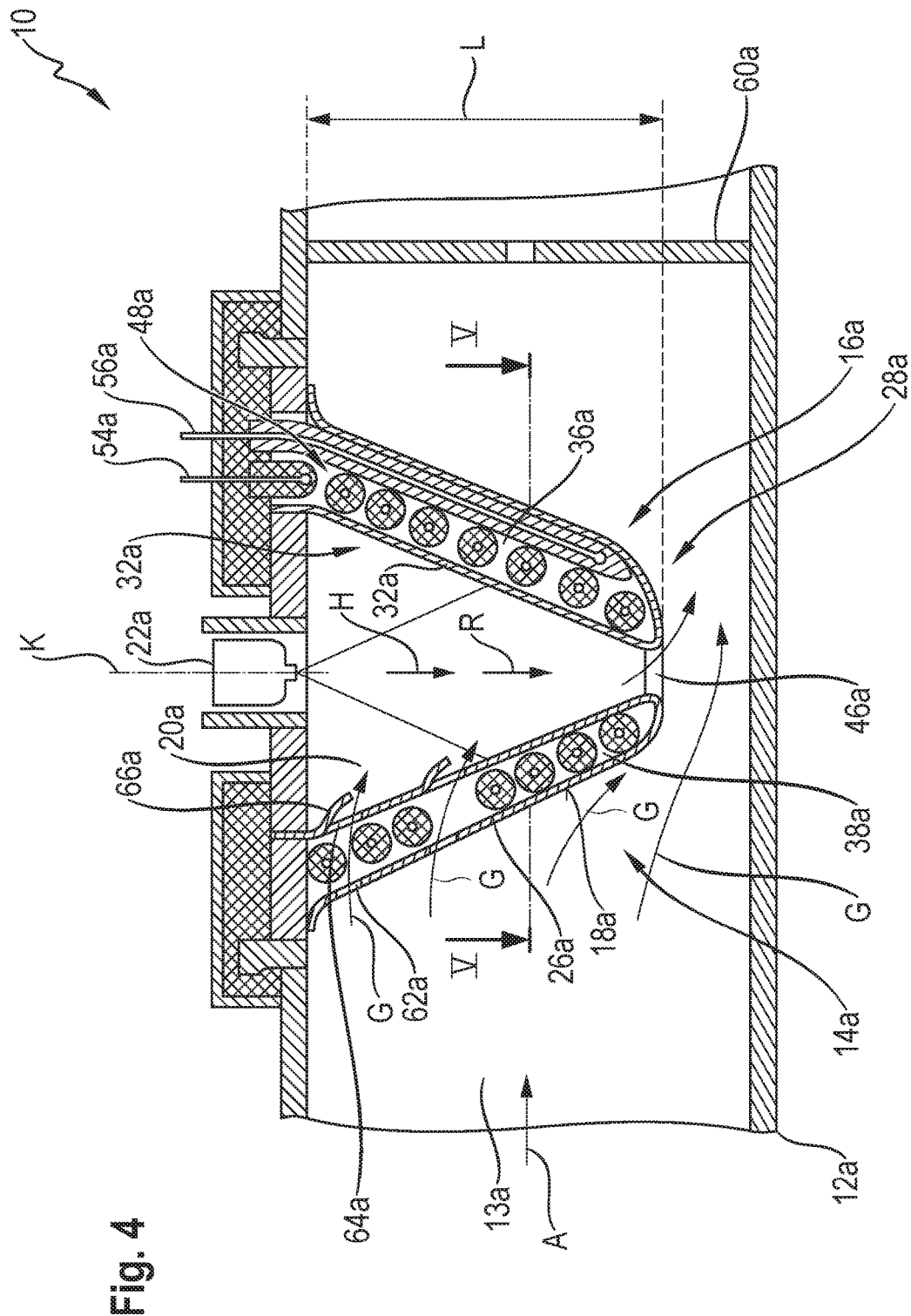
FIG. 4 is a longitudinal sectional view of an alternatively configured reactant release arrangement, which view corresponds to FIG. 1.
Figure 5:
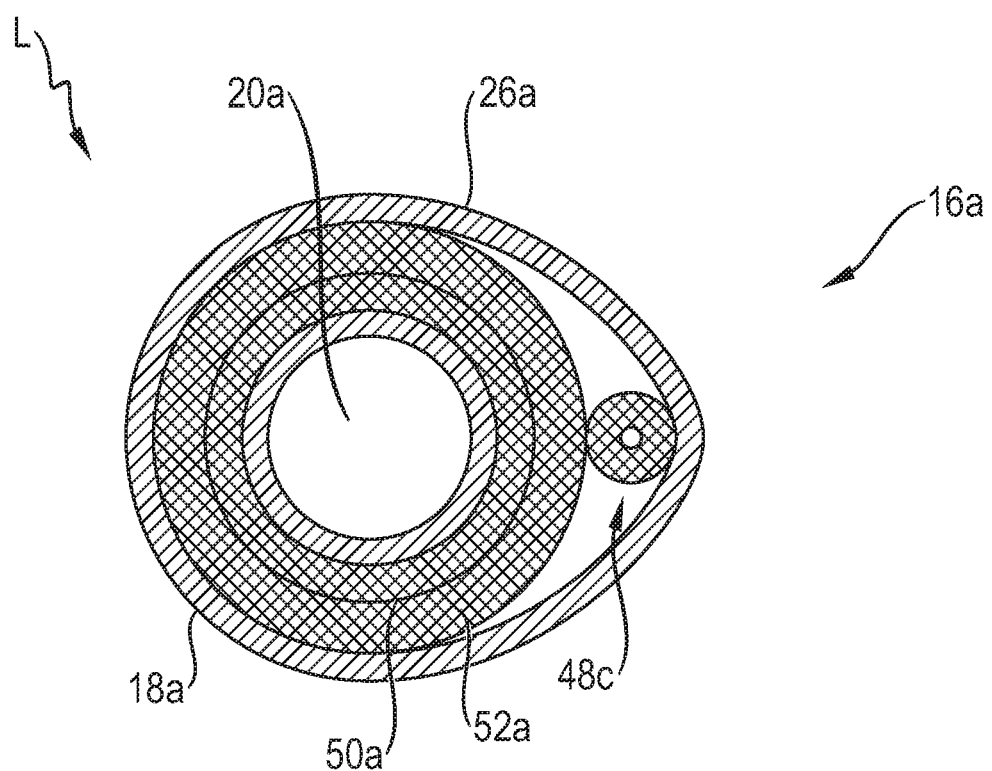
FIG. 5 is a sectional view through a reactant release body of the reactant release arrangement according to FIG. 4, cut along a line V-V in FIG. 4.

FIGS. 4 and 5 show an alternative embodiment of a reactant release arrangement. Components that correspond in terms of configuration and function to above-described components are designated by the same respective reference numbers with an "a" added.

The reactant release body 14*a* is configured over its entire length area L extending in the direction of the longitudinal axis K of the body with an essentially funnel-shaped or tapering structure. Just as in the case of the above-described embodiment, both the inner wall 30*a* and the outer wall 26*a* have a corresponding funnel-shaped or frustoconical shape in order to also provide in this manner the structure of the reactant-receiving volume 20*a*, which structure also tapers in the tapering direction R.

The reactant-receiving body 14a is open in its free end area 28a via an opening 46a towards the interior of the exhaust gas guide element 12a. Further, passage openings 62a and 64a, respectively, are provided especially at the upstream area of the body wall 16a in both the outer wall 26a and the inner wall 30a, and a pair each of passage openings 62a, 64a associated with one another may be oriented in relation to one another such that the exhaust gas G flowing in the exhaust gas guide element 12a can flow, as is indicated by flow arrows in FIG. 4, through a pair each of such passage openings 62a, 64a and into the reactant-receiving volume 20a. Flow guide elements 66a, which deflect the exhaust gas G flowing through these passage openings 64a in the direction of the body longitudinal axis K or the main reactant release direction H, may now be associated with the passage openings 64a provided at the inner wall 30a.

The inner wall 30a and the outer wall 26a, which also provide each the wall inner surface 32a and the wall outer surface 18a, respectively, may be formed integrally in one piece with a component provided, for example, as a shaped sheet metal part in this compact design of the reactant release body 14a, which is shown in FIGS. 4 and 5, and they can define between them the volume 36a receiving the heating device 38a. The heat conductor 48a is arranged surrounding the inner wall 30a in this volume, so that the inner wall 30a and hence also the entire wall inner surface 32a can essentially be heated over the entire length over which the reactant release body 14a extends in the direction of the body longitudinal axis K.

While the exhaust gas G will not essentially enter the reactant-receiving volume 20 in the embodiment described with reference to FIGS. 1 through 3, the exhaust gas G also flows through this reactant-receiving volume 20a in the embodiment shown in FIGS. 4 and 5 and thus it actively ensures that the reactant M injected into the reactant-receiving volume 20a will already be mixed with exhaust gas G in the area of this reactant-receiving volume 20a and will be actively removed by this waste gas from the reactant-receiving volume.

Figure 6:
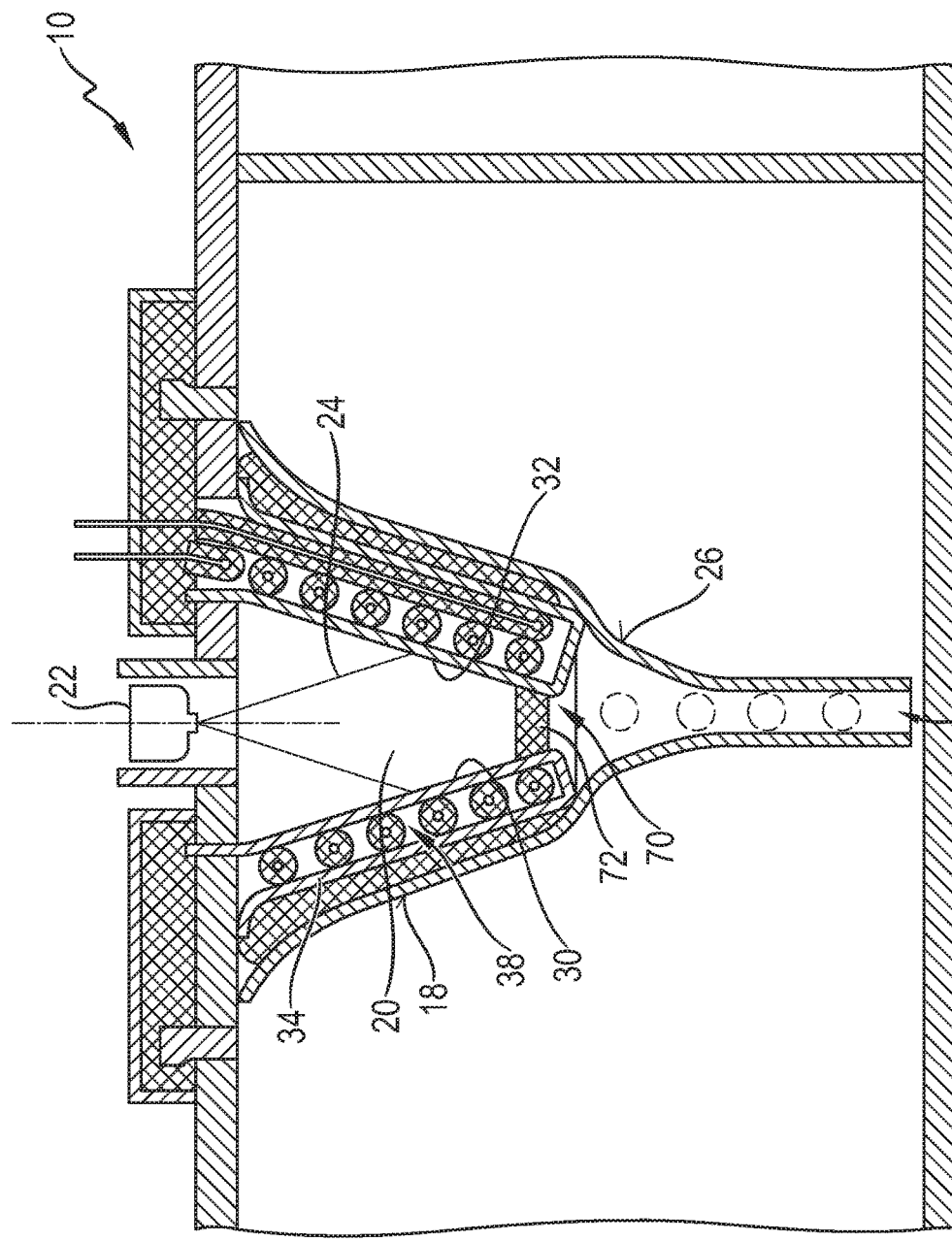
FIG. 6 is a variant of the reactant release arrangement shown in FIG. 1.

FIG. 6 shows a variant of the reactant release arrangement 10 shown in FIG. 1. A reactant filter 72 is arranged in the reactant-receiving volume 20 in the area of an opening 70, via which this volume is open for the discharge of reactant. The reactant filter 72, which is preferably made of a porous material, for example, a metal foam material or foam ceramic material, prevents reactant from being discharged from the reactant-receiving volume 20 in the form of droplets. The reactant reaching the reactant filter 72 in the form of droplets is taken up by said filter because of its porous structure. Since the reactant filter 72 is heated by the heating device 38 provided in the body wall 16, the reactant taken up by this in the liquid form is also heated and is released in the form of vapor or in a gaseous form. The reactant present in the reactant-receiving volume 20 in the gaseous form or in the vapor form can diffuse through the open-pore structure of the reactant filter 72.

It should be noted that other structures may also be used for the reactant filter 72. For example, a metal mesh or generally a metallic or ceramic fiber material may thus be used. A lamellar array with such a positioning of individual lamella elements that prevents the direct passage of reactant droplets and is overlapping in some areas may be provided as well.

Figure 7:
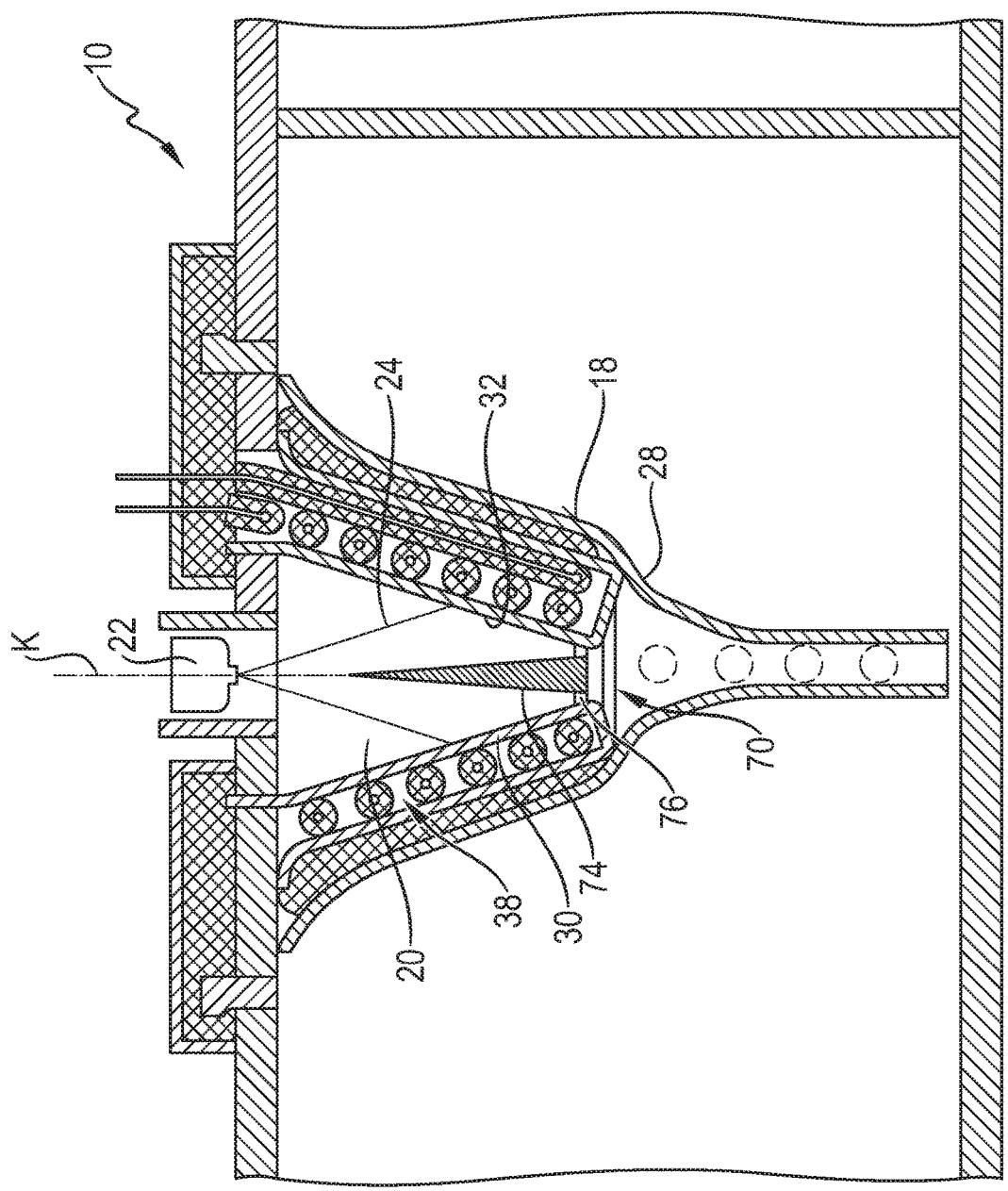
FIG. 7 is another variant of the reactant release arrangement shown in FIG. 1.
Figure 8:
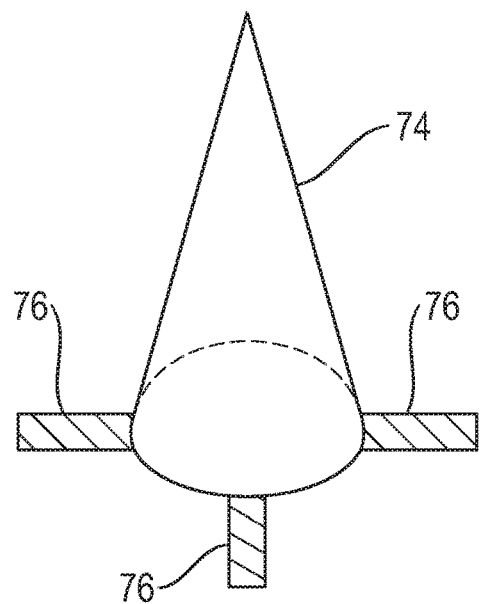
FIG. 8 is a lateral view of a reactant deflection element used in the reactant release arrangement according to FIG. 7.

A conically shaped reactant deflection element 74 shown in FIG. 8 is arranged in the reactant-receiving volume 20 in the variant of the reactant release arrangement 10 shown in FIG. 7. This reactant deflection element is carried on the inner wall 30 via a plurality of carrier projections 76. The reactant deflection element 74 is preferably oriented along the body longitudinal axis K and thus it expands in the direction away from the reactant release unit 22.

The reactant released by the reactant release unit 22 in the form of the spray cone 24 reaches the surface of the reactant deflection element 74 in the central area of the reactant-receiving volume 20 and is deflected by this outwardly in the direction of the heated wall inner surface 32. The discharge of reactant in the form of droplets from the reactant-receiving volume 20 can extensively be prevented in this manner as well.

Figure 9:
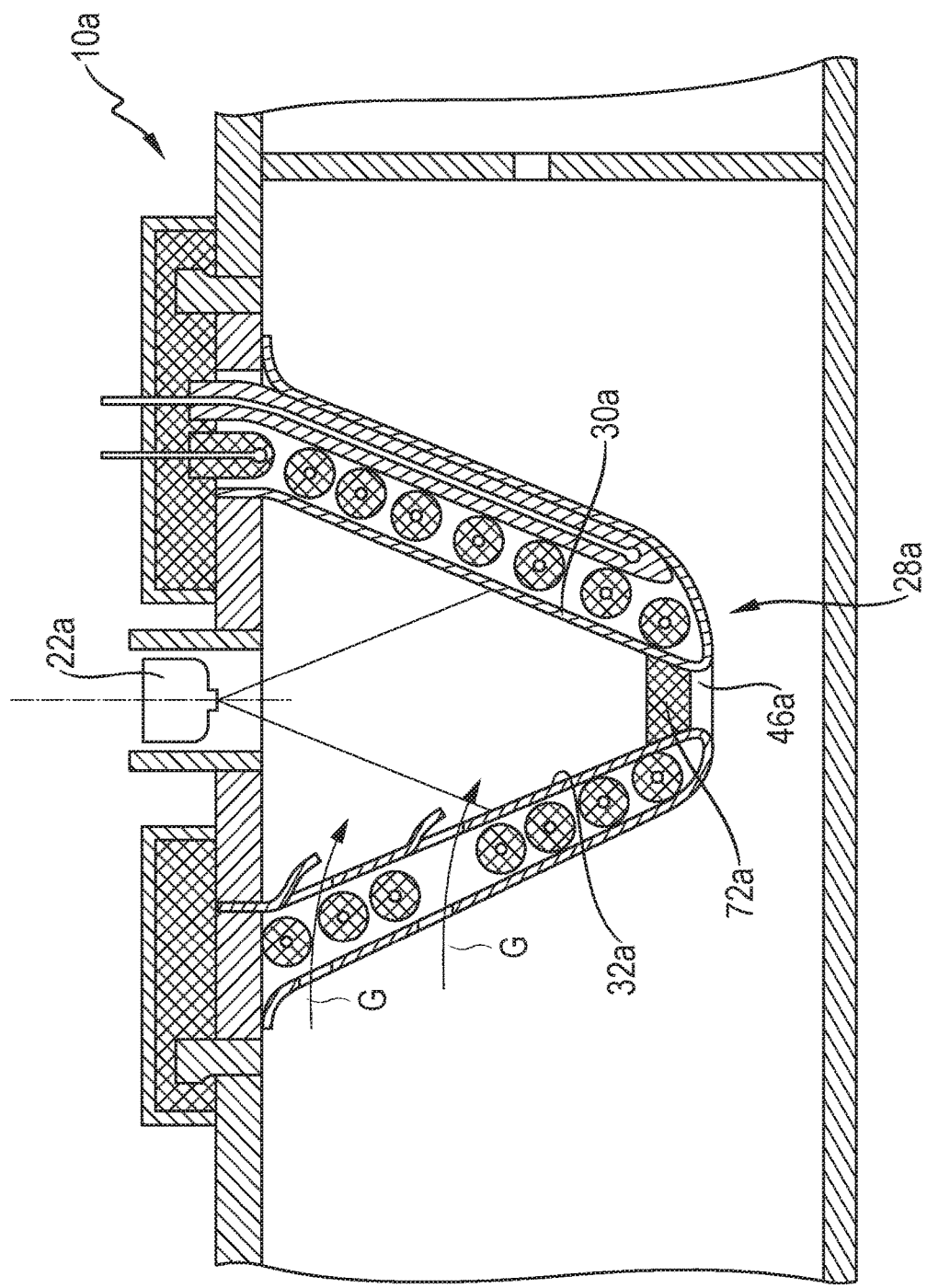
FIG. 9 is a variant of the reactant release arrangement shown in FIG. 4.
Figure 10:
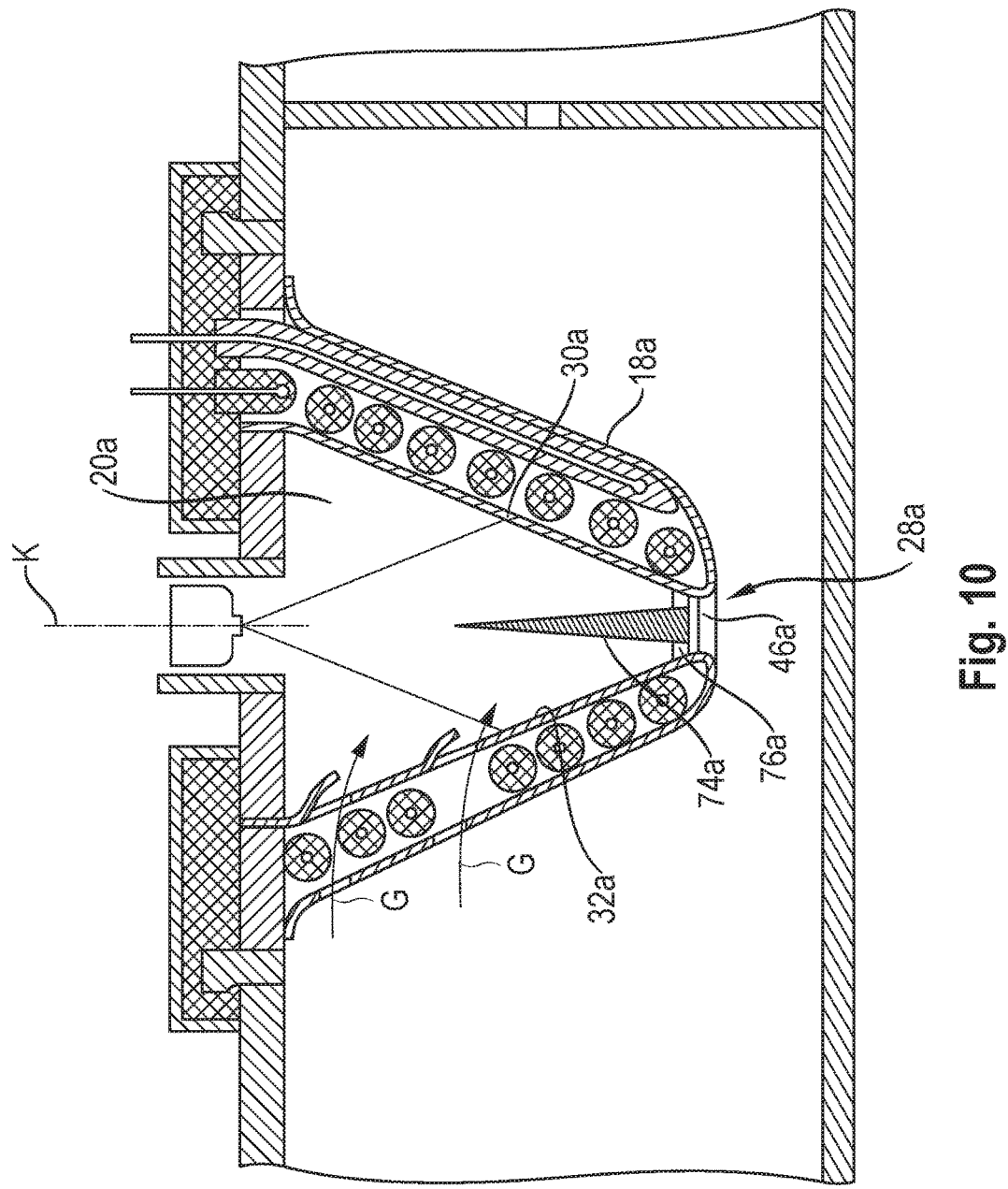
FIG. 10 is another variant of the reactant release arrangement shown in FIG. 4.

FIGS. 9 and 10 show that a reactant filter 72a located in the area of the opening 46a or a reactant deflection element 74a preferably extending along the body longitudinal axis K may also be provided in the embodiment of the reactant release arrangement 10a shown in FIG. 4. It should be noted in this connection that a reactant filter may be provided in combination with a reactant deflection element in both this embodiment and the embodiment of the reactant release arrangement described above with reference to FIGS. 6 and 7.

Figure 11:
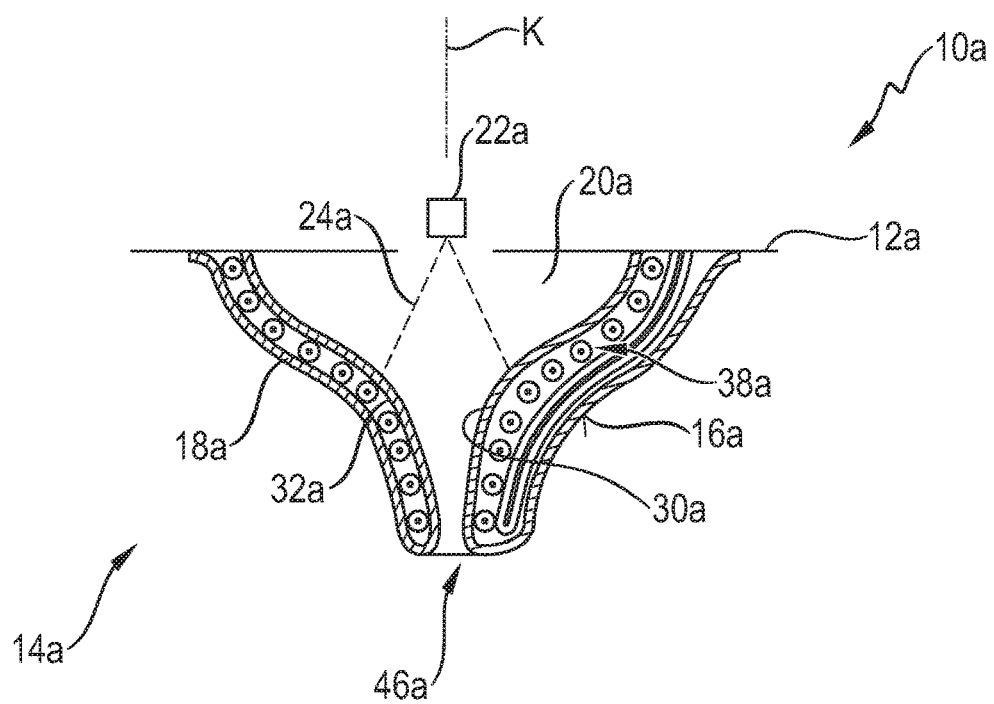
FIG. 11 is a reactant release arrangement with an alternative embodiment of a tapering reactant-receiving volume.

Based on the embodiment of the reactant release arrangement 10a shown in FIG. 4, FIG. 11 shows as an example that the reactant-receiving volume 20a may also be provided with another tapering structure. In the exemplary embodiment shown in FIG. 11, the reactant-receiving volume 20 tapers with a structure curved in the shape of an S, in which there is at first a greater reduction in the radius relative to a length unit in the direction of the body longitudinal axis K starting from the exhaust gas guide element 12a, and then there is a smaller reduction of the radius relative to a length unit in the direction of the body longitudinal axis K in the area approaching the opening 46a.

Figure 12:
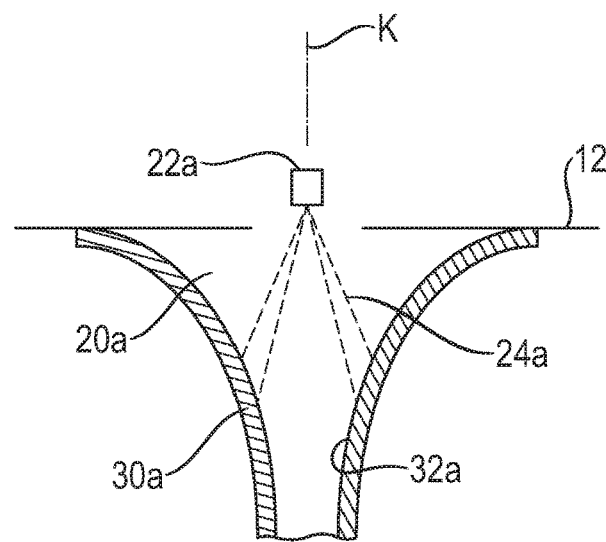
FIG. 12 is another alternative embodiment of a tapering reactant-receiving volume.

FIG. 12 shows a structure in which the reactant-receiving volume 20a tapers with an essentially hyperbolical structure or with a hyperboloid structure in relation to the body longitudinal axis K. There is at first a greater reduction of the radius in the area adjoining the exhaust gas guide element 12a than in a length area approaching the opening, via which the reactant-receiving volume 20a is open, in this case as well.

Figure 13:
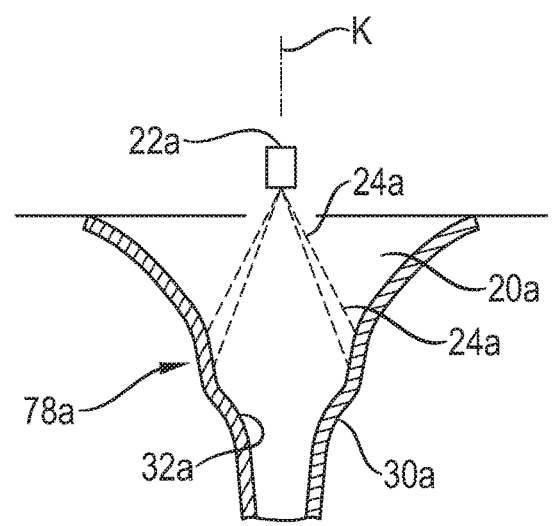
FIG. 13 is another alternative embodiment of a tapering reactant-receiving volume.

FIG. 13 shows a structure in which an essentially conical section 78a, i.e., a section 78a configured with an approximately linear reduction of the radius, is inserted into the basically hyperbolically tapering shape of the reactant-receiving volume 20a. The reactant-releasing unit 22a now can release the reactant in the form of the spray cone 24a essentially onto this section 78a.

FIG. 13 thus illustrates that in various length areas the reactant-receiving volume 20a or the inner wall 30a essentially surrounding this volume can be configured with length areas of varying tapering geometry. It should also be noted that the structures described above may also be provided in the exemplary embodiment of the reactant release arrangement shown in FIG. 1.

Figure 14:
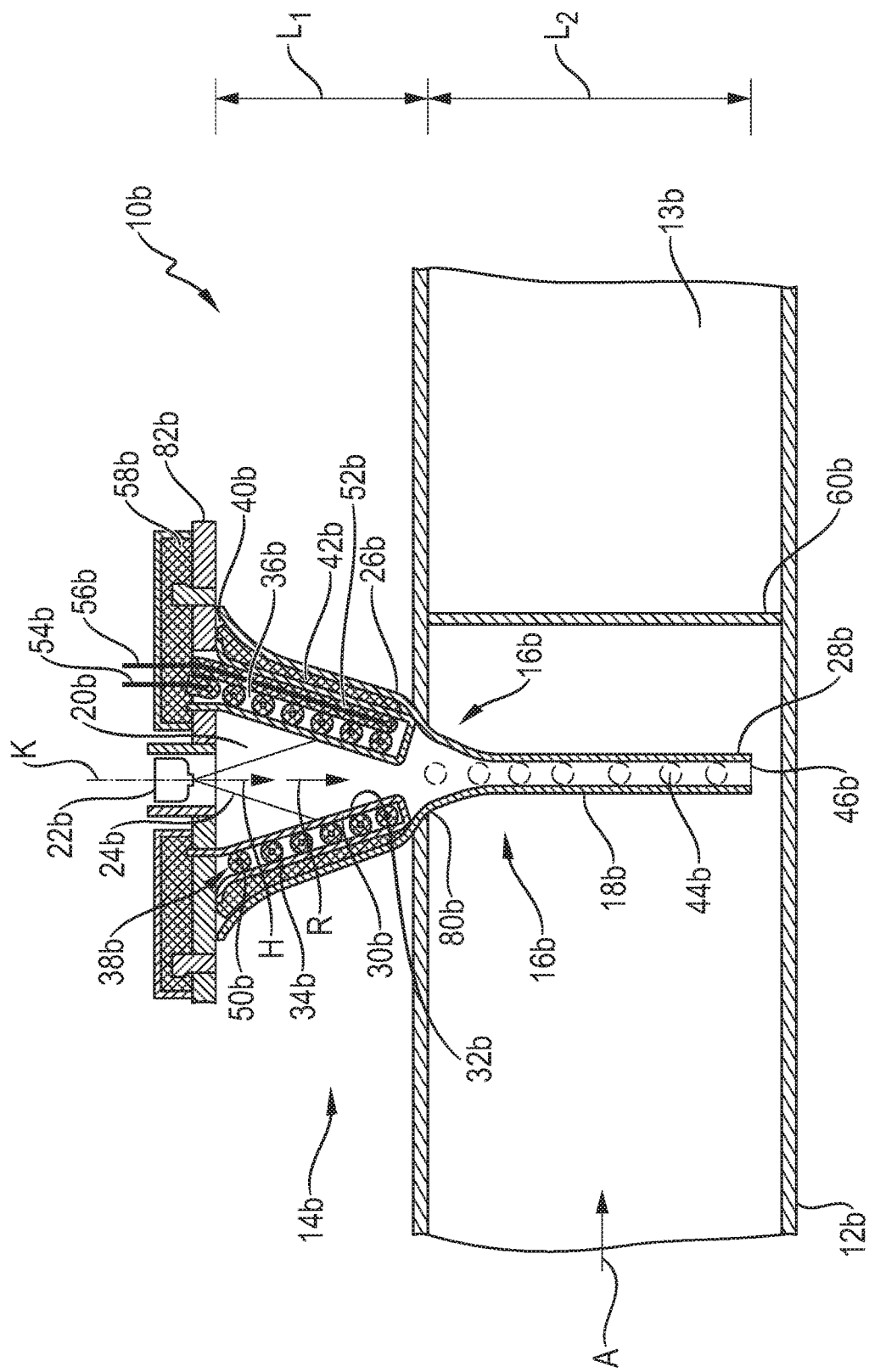
FIG. 14 is another variant of the reactant release arrangement shown in FIG. 1.

Another modified embodiment of a reactant release arrangement is shown in FIG. 14. Components and assembly units that correspond in terms of design and function to components and assembly units of the embodiment shown in FIGS. 1-3 are designated in FIG. 14 by the same reference numbers with a "b" added.

Before describing below the design of the reactant release arrangement 10b shown in FIG. 14 in detail, it should be noted that this reactant release arrangement 10b, which is based essentially on the construction principle of the embodiment according to FIGS. 1-3, may also be varied, in principle, in different ways, for example, by providing the reactant filter that can be seen in FIG. 6, the reactant deflection element shown in FIG. 7 or/and the tapering geometries shown in FIGS. 11-13.

In the configuration shown in FIG. 14, the reactant release arrangement 10b is positioned such that it is positioned with the transition area 80b between the first length area $L_1$ and the second length area $L_2$ adjoining the exhaust gas guide element 12b and is carried at the exhaust gas guide element 12b. It should be noted here that the reactant release arrangement is carried at the exhaust gas guide element in the sense of the present invention if there is a supporting interaction or/and a sealing interaction between these two assembly units. This can be accomplished in the configuration according to FIG. 14 if, for example, the outer wall 26b is fixed in the transition area 80b to the exhaust gas guide element 12b, for example, by connection in substance by welding and thus especially also in a gas-tight manner.

The reactant release arrangement 10b is located with its tapering first length area $L_1$ outside the exhaust gas flow duct 13b. The reactant release arrangement 10b or the reactant release body 14b thereof extends in the exhaust gas flow duct 13b with its second length area $L_2$ only and the exhaust gas A flowing in the exhaust gas flow duct 13b can flow around it there at the wall outer surface 18b of the body wall 16b of the reactant release body 14b. Thus, only the second length area $L_2$, which has only a comparatively small radial dimension at right angles to the body longitudinal axis K, does extend in the exhaust gas flow duct 13b, as a result of which a comparatively low flow resistance develops for the exhaust gas A flowing in the exhaust gas flow duct 13b. The reactant release body 14b is open in this area for the discharge of the reactant R into the exhaust gas flow duct 13b and for mixing with the exhaust gas A flowing in it especially by means of the mixer 60b positioned downstream via the passage openings 44b as well as the opening 46b at the free end area 28b.

While the reactant release body 14b is positioned adjoining the exhaust gas guide element 12b and is carried on same in the area of the transition area 80b, i.e., in an area in which the reactant release body 14b has its smallest radial dimension in its first length area $L_1$ in relation to the body longitudinal axis K, in this embodiment of the reactant release arrangement shown in FIG. 14, the reactant release body can be carried on an additional carrier 82b in the area of the first length area $L_1$, in which the reactant release body 14b has its greatest radial dimension in relation to the body longitudinal axis K. This carrier may be provided by a tube section, which surrounds the exhaust gas guide element 12b and is, for example, also fixed to same.

It should be noted that the reactant release body 14b may also be positioned adjoining the exhaust gas guide element 12b or carried on same in other sections of the first length area $L_1$ or of the second length area $L_2$. For example, the first length area $L_1$ could thus be positioned such that it partly meshes with the exhaust gas flow duct 13b. As an alternative, the reactant release body 14b could be carried on the exhaust gas guide element 12b in the area of the second length area $L_2$, i.e., fixed in a gas-tight manner, so that this second length area $L_2$ extends partly outside the exhaust gas flow duct 13b and does not now have, of course, any passage openings 44b in this area.

The present invention provides a reactant release arrangement, which can ensure a reliable evaporation of the reactant based on the possibility of being able to heat a surface to be wetted with reactant, regardless of the ambient temperatures and the temperature of the exhaust gas flowing around the reactant release body. Reliable evaporation of reactant and a correspondingly reliable mixing of the reactant with exhaust gas can thus also be ensured at comparatively low temperatures.

While specific embodiments of the invention have been shown and described in detail to illustrate the application of the principles of the invention, it will be understood that the invention may be embodied otherwise without departing from such principles.

What is claimed is:

1. A reactant release arrangement for releasing reactant into the exhaust gas stream of an internal combustion engine, the reactant release arrangement comprising:
   an exhaust gas guide element providing an exhaust gas flow duct and having a direction of longitudinal extension corresponding to a main exhaust gas flow direction of exhaust gas flowing in the exhaust gas flow duct;
   a reactant release body carried extending into the exhaust gas flow duct along a longitudinal axis of the reactant release body at the exhaust guide element, the reactant release body comprising a body wall, wherein a reactant-receiving volume is surrounded by a wall inner surface of the body wall and is provided in the reactant release body and exhaust gas flowing in the exhaust gas flow duct flows around the reactant release body at a wall outer surface of the body wall and the reactant-receiving volume is open to the exhaust gas flow duct via at least one passage opening;
   a reactant release unit for releasing reactant into the reactant-releasing volume; and
   a heating device for heating the reactant release body, the heating device being associated with the body wall at least in an area of the wall inner surface of the body wall, wherein the body wall comprises an inner wall at least partly providing the wall inner surface and an outer wall at least partly providing the wall outer surface, and the heating device is arranged between the inner wall and the outer wall.

2. A reactant release arrangement in accordance with claim 1, wherein the reactant-receiving volume is configured tapering in a tapering direction in a direction of the body longitudinal axis in at least some areas.

3. A reactant release arrangement in accordance with claim 2, wherein the reactant-receiving volume tapers essentially conically, hyperbolically or in has a curved taper in at least some areas.

4. A reactant release arrangement in accordance with claim 2, wherein the body wall has an essentially conically tapering configuration in the tapering direction in at least some areas.

5. A reactant release arrangement in accordance with claim 2, wherein the body wall has an essentially tapering configuration in the tapering direction in a first length area and has the at least one passage opening or is open in a direction of the body longitudinal axis in a tubular second length area adjoining the first length area.

6. A reactant release arrangement in accordance with claim 5, wherein the body wall is arranged with the first length area and with the second length area in the exhaust gas flow duct, such that the first length area is positioned adjoining the exhaust gas guide element in an area of a greatest radial dimension in relation to the body longitudinal axis.

7. A reactant release arrangement in accordance with claim 5, wherein the first length area is arranged at least partly outside of the exhaust gas flow duct and the second length area is arranged at least partly in the exhaust gas flow duct, such that the first length area is positioned adjoining the exhaust gas guide element in an area of a smallest radial dimension in relation to the body longitudinal axis or in an area of a transition area from the first length area to the second length area.

8. A reactant release arrangement in accordance with claim 2, wherein the body wall has an essentially conically tapering configuration in a length area adjoining the exhaust gas guide element and has at least one passage opening in the length area or is open in a direction of the body longitudinal axis at an end located at a distance from the exhaust gas guide element.

9. A reactant release arrangement in accordance with claim 2, wherein the reactant release unit is arranged in a main reactant release direction that is essentially parallel to the body longitudinal axis and essentially corresponds to the tapering direction.

10. A reactant release arrangement in accordance with claim 1, further comprising a reactant filter wherein the reactant-receiving volume is open for the discharge of reactant in an area of an opening and that the reactant filter is provided in the reactant-receiving volume in an area of the opening.

11. A reactant release arrangement in accordance with claim 10, wherein the reactant filter comprises a porous metal foam material.

12. A reactant release arrangement in accordance with claim 1, further comprising a reactant deflection element provided in the reactant-receiving volume, wherein the reactant deflection element is configured conically expanding in a direction away from the reactant release unit.

13. A reactant release arrangement in accordance with claim 1, wherein the body longitudinal axis is essentially at right angles to a main exhaust gas flow direction.

14. A reactant release arrangement in accordance with claim 1, wherein:
 the body wall further comprises an intermediate wall arranged between the inner wall and the outer wall, and the heating device is arranged between the inner wall and the intermediate wall or insulating material is arranged between the intermediate wall and the outer wall; or
 the heating device is arranged surrounding the inner wall in a helical pattern or the heating device is arranged in at least one length area of the body wall with tapering reactant-receiving volume.

15. An exhaust system for an internal combustion engine, the exhaust system comprising a reactant release arrangement, the reactant release arrangement comprising:
 an exhaust gas guide element providing an exhaust gas flow duct configured for exhaust gas to flow within the exhaust gas flow duct in a main exhaust gas flow direction;
 a reactant release body carried extending into the exhaust gas flow duct along a longitudinal axis of the reactant release body at the exhaust guide element, the reactant release body comprising a body wall, wherein a reactant-receiving volume is surrounded by a wall inner surface of the body wall and is provided in the reactant release body and exhaust gas flowing in the exhaust gas flow duct flows around the reactant release body at a wall outer surface of the body wall, the reactant-receiving volume is open to the exhaust gas flow duct via at least one passage opening and the body wall comprises an inner wall at least partly providing the wall inner surface and an outer wall at least partly providing the wall outer surface;
 a reactant release unit for releasing reactant into the reactant-releasing volume; and
 a heating device for heating the reactant release body, the heating device being associated with the body wall at least in an area of the wall inner surface of the body wall, wherein the heating device is arranged between the inner wall and the outer wall.

16. An exhaust system in accordance with claim 15, wherein the reactant-receiving volume is configured tapering in a tapering direction in a direction of the body longitudinal axis in at least some areas.

17. An exhaust system in accordance with claim 16, wherein the body wall has an essentially tapering configuration in the tapering direction in a first length area and has the at least one passage opening or is open in a direction of the body longitudinal axis in a tubular second length area adjoining the first length area.

18. An exhaust system in accordance with claim 17, wherein the body wall is arranged with the first length area and with the second length area in the exhaust gas flow duct, such that the first length area is positioned adjoining the exhaust gas guide element in an area of a greatest radial dimension in relation to the body longitudinal axis.

19. An exhaust system in accordance with claim 17, wherein the first length area is arranged at least partly outside of the exhaust gas flow duct and the second length area is arranged at least partly in the exhaust gas flow duct, such that the first length area is positioned adjoining the exhaust gas guide element in an area of a smallest radial dimension in relation to the body longitudinal axis or in an area of a transition area from the first length area to the second length area.

20. A reactant release arrangement in accordance with claim 2, wherein the body wall has an essentially tapering configuration in the tapering direction in a first length area and has the at least one passage opening and is open in a direction of the body longitudinal axis in a tubular second length area adjoining the first length area.

21. A reactant release arrangement in accordance with claim 2, wherein the body wall has an essentially conically tapering configuration in a length area adjoining the exhaust gas guide element and has at least one passage opening in the length area and is open in a direction of the body longitudinal axis at an end located at a distance from the exhaust gas guide element.

22. A reactant release arrangement in accordance with claim 1, wherein:
 the body wall further comprises an intermediate wall arranged between the inner wall and the outer wall, and the heating device is arranged between the inner wall and the intermediate wall and insulating material is arranged between the intermediate wall and the outer wall; and
 the heating device is arranged surrounding the inner wall in a helical pattern and the heating device is arranged in at least one length area of the body wall with tapering reactant-receiving volume.

23. An exhaust system in accordance with claim 16, wherein the body wall has an essentially tapering configuration in the tapering direction in a first length area and has the at least one passage opening and is open in a direction of the body longitudinal axis in a tubular second length area adjoining the first length area.

24. A reactant release arrangement for releasing reactant into the exhaust gas stream of an internal combustion engine, the reactant release arrangement comprising:
- an exhaust gas guide element providing an exhaust gas flow duct and having a direction of longitudinal extension corresponding to a main exhaust gas flow direction of exhaust gas flowing in the exhaust gas flow duct;
- a reactant release body carried extending into the exhaust gas flow duct along a longitudinal axis of the reactant release body at the exhaust guide element, the reactant release body comprising a body wall, wherein a reactant-receiving volume is surrounded by a wall inner surface of the body wall and is provided in the reactant release body and exhaust gas flowing in the exhaust gas flow duct flows around the reactant release body at a wall outer surface of the body wall and the reactant-receiving volume is open to the exhaust gas flow duct via at least one passage opening;
- a reactant release unit for releasing reactant into the reactant-releasing volume;
- a heating device for heating the reactant release body, the heating device being associated with the body wall at least in an area of the wall inner surface of the body wall; and
- a reactant deflection element provided in the reactant-receiving volume, wherein the reactant deflection element is configured conically expanding in a direction away from the reactant release unit.

25. An exhaust system for an internal combustion engine, the exhaust system comprising a reactant release arrangement, the reactant release arrangement comprising:
- an exhaust gas guide element providing an exhaust gas flow duct configured for exhaust gas to flow within the exhaust gas flow duct in a main exhaust gas flow direction;
- a reactant release body carried extending into the exhaust gas flow duct along a longitudinal axis of the reactant release body at the exhaust guide element, the reactant release body comprising a body wall, wherein a reactant-receiving volume is surrounded by a wall inner surface of the body wall and is provided in the reactant release body and exhaust gas flowing in the exhaust gas flow duct flows around the reactant release body at a wall outer surface of the body wall and the reactant-receiving volume is open to the exhaust gas flow duct via at least one passage opening;
- a reactant release unit for releasing reactant into the reactant-releasing volume;
- a heating device for heating the reactant release body, the heating device being associated with the body wall at least in an area of the wall inner surface of the body wall; and
- a reactant deflection element provided in the reactant-receiving volume, wherein the reactant deflection element is configured conically expanding in a direction away from the reactant release unit.

* * * * *